Aug. 10, 1943.  P. H. LIGHT  2,326,149
PROTECTION OF ALTERNATING CURRENT ELECTRIC POWER SYSTEMS
Filed April 24, 1942
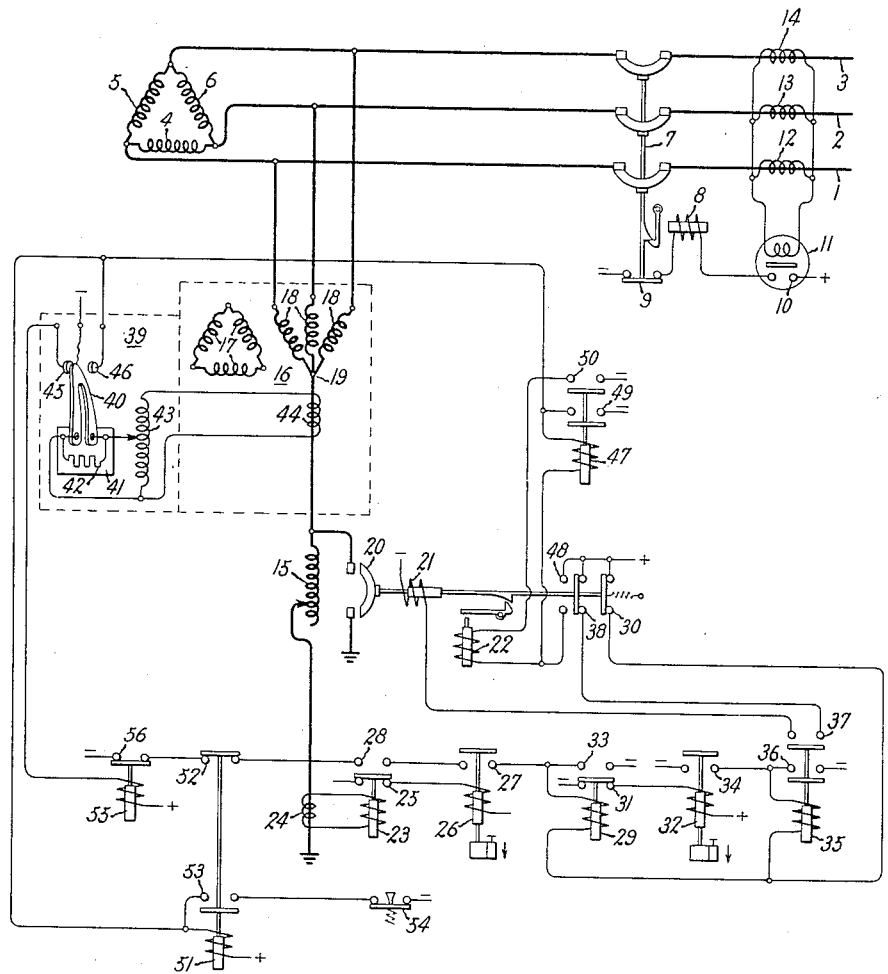
Inventor:
Philip H. Light,
by Harry E. Dunham
His Attorney.

Patented Aug. 10, 1943

2,326,149

UNITED STATES PATENT OFFICE 2,326,149

PROTECTION OF ALTERNATING CURRENT ELECTRIC POWER SYSTEMS

Philip H. Light, Schenectady, N. Y., assignor to General Electric Company, a corporation of New York Application April 24, 1942, Serial No. 440,277

12 Claims. (Cl. 175—294)

My invention relates to improvements in the protection of alternating current electric power systems, and especially systems of the type wherein a fault to ground on a phase conductor of the system substantially increases the capacitance current to ground of the ungrounded phase conductors and wherein ground faults of a transient character are to be cleared by a zero sequence inductive connection to ground proportioned to provide on the occurrence of a ground fault on a phase conductor of the system a lagging current for effectively suppressing the capacitance current at the grounded point.

In alternating current power systems which operate without a neutral grounded more or less directly, single conductor-to-ground faults of a transitory or arcing character may be suppressed by a ground fault neutralizing device, as disclosed in United States Letters Patent 1,537,371, issued May 12, 1925, without interruption of service. Since a large percentage of the faults on alternating current electric systems involve initially, at least, only a single conductor-to-ground, such neutralizing device materially improves the service continuity factor. The neutralizing device is usually connected between a neutral of the system and ground and proportioned to have, together with the means providing the neutral, a zero sequence inductance such as to provide on the occurrence of a ground on a phase conductor of the system a lagging current for effectively suppressing the capacitance current to ground of the ungrounded phase conductors. Usually the neutral is provided by inductive apparatus such as a zig-zag or Y-delta grounding transformer or a Y-delta power transformer. Ordinarily the amount of the inductance provided by such transforming means in the neutralizer connection is a relatively small proportion of the total inductance of this connection.

In order to take care of faults which the ground fault neutralizer cannot suppress, a low impedance connection to ground may be established after the flow of lagging current in the neutralizer connection for a predetermined time without suppressing the ground fault, as disclosed in United States Letters Patent 1,378,577, issued May 17, 1921. This low impedance connection, which is usually effected by short-circuiting all or part of the ground fault neutralizer, allows sufficient flow of fault current for the intended operation of the ground fault responsive relays with which the system is usually provided to clear ground faults of a permanent character, because of the relatively low impedance of the transformer used to provide the neutral for grounding. In other words, when this low impedance connection is established, there is a relatively heavy current flow in comparison with the arc-suppressing lagging current flow.

Although it is economically feasible to provide a transformer with a relatively long time rating on the basis of the arc-suppressing lagging current flow, the cost of a transformer which would safely pass the relatively high current flow required for satisfactory ground fault relaying for anything but a short time rating is ordinarily prohibitive. Obviously then, if the ground fault relays should fail to function within the safe current-time rating of the transformer for this higher current flow, destruction of the transformer would almost certainly follow. If the ground connection of the transformer neutral is interrupted to prevent overheating of the transformer, then the system becomes an isolated neutral system with a ground fault on one phase. This is likely to result in dangerous overvoltages which would damage or destroy insulation and lightning arresters on the system. Also, to open the neutral this way requires additional costly equipment. Furthermore, the operating personnel is handicapped by the inability of determining where the fault is located.

One object of my invention is to provide an improved arrangement for protecting an alternating current electric system so that ground fault neutralizers may safely be used in connection with transformers which have a relatively short time rating for currents of the magnitude necessary for the ground fault relaying of the system without endangering the insulation of the system or apparatus connected thereto and without the necessity of providing expensive or complicated additional equipment. This and other objects of my invention will appear in more detail hereinafter.

In a protective arrangement for an alternating current electric system comprising a transformer having its neutral grounded through a ground fault neutralizer, I provide, in accordance with my invention, means for protecting the transformer against overheating by the ground fault current required for ground fault relaying of non-transitory ground faults, especially in case of failure of the ground fault relaying protection to function and without subjecting the system to dangerous overvoltages. More specifically, if the transformer is initially too hot to hazard a reduction in the impedance of the inductive connection to ground in case of non-transitory ground faults, I prevent, in accordance with my invention, such reduction by means responsive in accordance with the heating of the transformer. Also, if the impedance reduction does occur following failure of the ground fault neutralizer to clear the ground fault, then if the system ground fault relaying fails to clear the fault before the transformer is dangerously overheated, I provide, in accordance with my invention, means responsive to the heating of the transformer for restoring the ground connection to its initial inductive value and maintaining it at such value whereby the system may continue to operate without being subjected to dangerous overvoltages as might occur with the neutral disconnected from ground.

My invention will be better understood from the following description when considered in connection with the accompanying drawing, and its scope will be pointed out in the appended claims.

The single figure of the accompanying drawing diagrammatically illustrates an embodiment of my invention in a ground fault neutralizer protective arrangement for a three-phase alternating current electric system of the type in which a fault to ground on a phase conductor of the system substantially increases the capacitance current to ground of the ungrounded phase conductors. As shown, the system comprises three phase conductors 1, 2, and 3 which are connected to the delta-connected windings 4, 5, and 6 of a power transformer or generator through suitable circuit interrupting means, such as a latched closed circuit breaker 7. This is provided with a trip coil 8 and an $a$ auxiliary switch 9 in circuit therewith. The circuit of the trip coil is arranged to be controlled through the contacts 10 of suitable ground fault responsive relaying means 11. As illustrated, this relaying means is a simple overcurrent relay connected to be energized in accordance with the vector sum of the currents in the phase conductors 1, 2, and 3 as derived from the parallel connected transformers 12, 13, and 14 respectively associated with these conductors. The application of other ground fault responsive relays, such as those which are directionally responsive, will be apparent to those skilled in the art.

In order to clear transitory or arcing ground faults without interruption of service such as would follow by opening the circuit breaker 7 every time there was a ground fault on one phase conductor, suitable suppressing means, such as a ground fault neutralizer 15, is provided. Since the ground fault neutralizer is usually connected to ground through a suitably derived system neutral, there is provided suitable means such as a grounding transformer 16 having delta-connected windings 17 and windings 18 Y-connected to the system phase conductors 1, 2, and 3 to provide a neutral 19. It will be apparent to those skilled in the art that and inductive reactance providing a neutral and a relatively low zero-sequence inductance may be used. The inductive reactance or ground fault neutralizer 15 is proportioned to have, together with the transformer 16, a zero-sequence inductance such as to provide on the occurrence of a ground on a phase conductor of the system a lagging current for effectively suppressing the capacitance current to ground of the ungrounded phase conductors. Ordinarily, the amount of the inductance provided by the transformer in the neutralizer connection is a relatively small proportion of the total inductance of this connection in order that, for ground faults which the ground fault neutralizer can not suppress, sufficient ground fault current may flow after the neutralizer is short-circuited to permit the operation of the system ground fault relay 11. Also, the grounding transformer is usually designed to have a relatively short current-time rating when it is used to ground the system directly.

In order that the system ground fault relaying means may take care of non-transitory ground faults on the system, an arrangement is provided to establish a low impedance path to ground from the neutral 19 in response to a predetermined current flow for a predetermined time in the neutralizer connection through the neutral 19. For this purpose, the neutral 19 may be arranged to be connected substantially directly to ground by the closing of suitable switching means herein illustrated as a normally open circuit breaker 20 of the latched closed type. This circuit breaker is provided with suitable closing means indicated as a closing coil 21 and also with suitable latch releasing means, such as a trip coil 22.

The closing of the circuit breaker 20 is effected by a suitable time delay relay sequence which is initiated by the operation of a relay 23. This relay is operative in dependence on the current flowing in the neutralizer 15 and may be connected to be energized from a current transformer 24 in series relation with the neutralizer, as shown. The normally closed contacts 25 of the relay 23 maintain the energizing circuit of a time delay drop-out relay 26 which may be of the induction disk alternating current energized type, examples of which are well known to the art.

When the relay 26 closes its contacts 27 while the relay 23 is energized with its contacts 28 closed, the circuit of an auxiliary relay 29 is completed through $b$ auxiliary switch contacts 30 of the circuit breaker 20. This auxiliary relay 29 through its normally closed contacts 31 controls the circuit of a second time delay relay 32 and, when energized, also completes its own circuit through its normally open contacts 33. When the second time delay relay 32 drops out, the closing of its normally open contacts 34 completes the circuit of a closing relay 35 through the $b$ contacts 30 of the circuit breaker 20. The closing relay 35 picks up to close its normally open seal-in contacts 36 and also its normally open contacts 37, the closing of which completes the circuit of the closing coil 21 through the $b$ auxiliary switch contacts 38 of the circuit breaker 20. With the completion of this circuit, the closing action of the circuit breaker 20 will by-pass the ground fault neutralizer 15 and thus reduce the impedance of the inductive connection to ground.

Upon the closing of the circuit breaker 20, the impedance of this connection is so reduced that enough ground fault current can flow to effect the intended operation of the ground fault relay 11. If, however, this ground fault relay or the circuit breaker 7 controlled thereby should fail to function as intended and thus not disconnect the fault from the grounding transformer 16, then this transformer would be subjected to a sustained high current flow exceeding the current-time rating of the transformer. Destruction or at least serious damage to the transformer would follow. In order to prevent such destruction or damage, I provide, in accordance with my invention, means 39, the response of which is based on or reflects the heating of the grounding transformer, for restoring the neutralizer connection to its original inductive value so as to limit not only the current therein to a value which the transformer can safely carry but also to restore the system to its initially protected condition whereby to avoid dangerous overvoltages which would otherwise be possible by just merely opening the neutral-to-ground connection.

As shown, the heat responsive means 39 is a relay of the thermal type disclosed in United States Letters Patent 1,501,017, issued July 8, 1924. This relay has a thermal element comprising a thermostatic metal strip 40 and a thermal storage block 41 provided with a heating element 42. The thermostatic strip 40 and the heating element 42 are electrically connected in parallel with a suitable tapped autotransformer 43 which is energized in dependence on the zero-sequence current flowing in the grounding transformer. Thus, for example, the autotransformer 43 may be connected in circuit with a current transformer 44 in series relation with the connection to ground of the neutral 19. As will be obvious to those skilled in the art, when the grounding transformer has a closed delta winding as shown, then a current transformer in series relation therewith will also provide a current proportional to the zero-sequence current flowing in the grounding transformer. The relay 39 also includes a cold contact 45 and a hot contact 46 through which circuits can be made or broken by the thermostatic strip 40.

Although for the purpose of illustrating my invention I have shown a specific thermally responsive relay, it will be apparent to those skilled in the art that other types of thermal relays can be used so long as they respond in accordance with the heating of the transformer. Broadly speaking, any relay whose time of contact controlling action is inversely proportional to the square of the zero-sequence current flowing in the ground connection through the neutral 19 will function in accordance with the heating of the grounding transformer 16. Thus, for example, an inverse time element induction type of motor relay whose rotor torque is dependent upon the square of the energizing current as obtained, for example, from the current transformer 44 may be employed. Examples of such relays are well known to the art. One advantage, however, accrues from the use of a strictly thermal type of relay in that by mounting it against or in the transformer tank the temperatures of both the transformer and the relay are initially substantially the same.

Now, in accordance with my invention, I so arrange that if the heating of the grounding transformer 16 tends to exceed the current-time rating of the transformer while the switch 20 is closed, this switch will be immediately opened to restore the impedance of the inductive connection to its initial inductive or capacitance current suppressing value. For this purpose, I so arrange that the closing of the contact 46 by the thermostatic strip 40 effects the energization of the trip coil 22. In order to do this and yet take care of the fairly large current drawn by the trip coil, there may be provided an auxiliary relay 47, the circuit of which is controlled through the hot contact 46 of the thermal relay and a auxiliary switch contacts 48 of the switch 20. The relay 47 includes circuit closing seal-in contacts 49 and circuit closing contacts 50 in the circuit of the trip coil 22 whereby to effect the energization of this trip coil if the circuit breaker 20 is closed.

Inasmuch as the opening of the switch 20 restores the neutralizer connection to its initial condition, the resultant flow of lagging current in this connection would again start the relaying sequence by which the switch 20 is closed. In order to prevent an undesired repetition of such closing during the continuance of a permanent fault which the ground fault relay means 11 and the circuit breaker 7 have been unable to disconnect from the grounding transformer 16, I further provide, in accordance with my invention, means for preventing a repetition of the closing of the switch 20 while the grounding transformer is excessively heated. While this can be done in different ways, I have shown an arrangement for preventing the time delay relay sequence operation by which the closing of the switch 20 is effected. Thus, for example, I provide an auxiliary relay 51 arranged to control normally closed contacts 52 in series with the winding of the auxiliary relay 29. The circuit of the relay 51 is controlled through the hot contact 46 of the thermal relay 39 so that as soon as the grounding transformer 16 is excessively heated, the relay 51 will be energized to open its normally closed contacts 52 and seal itself in through its normally open contacts 53. The opening of the contacts 52, of course, eliminates any further possibility of closing the switch 20 until the relay 51 is restored to its normally deenergized condition. This can be accomplished by the opening of a normally closed manually operated switch 54.

Since it is possible that under some abnormal system conditions the grounding transformer may become unduly heated, I may also provide, in accordance with my invention, means for preventing the initial closing of the switch 20 in the event that the transformer is already too warm before this occurs. For this purpose, I provide, as shown, an auxiliary relay 55 which, as long as it is energized, maintains its contacts 56 closed in the circuit of the auxiliary relay 29. Thus, as long as the contacts 56 of this relay and the contacts 52 of the relay 51 are closed, the closing operation of the switch 20 may occur. In accordance with my invention, I control the energization of the auxiliary relay 55 by the cold contact 45 of the thermal relay means 39. Then, if the grounding transformer 16 is sufficiently cool, the cold contact 45 will be closed to complete the circuit of the relay 55 and thus maintain its contacts 56 closed. If, on the other hand, the cold contact 45 is open when a ground fault occurs on the line or if it opens before the switch 20 can be closed by the sequencing relay operation, then the circuit of the auxiliary relay 29 will be broken at the contacts 56 of the relay 55, and the sequencing relay operation can not be carried out. Accordingly, the switch 20 can not be closed until such time as the thermostatic strip 40 engages the cold contact 45. While I have shown the contacts 52 of the auxiliary relay 51 and the contacts 56 of the auxiliary relay 55 in the circuit of the auxiliary relay 29, it will be obvious to those skilled in the art that all that is required is that the auxiliary relays 51 and 55 prevent the closing of the switch 20 when the transformer is not sufficiently cool, and that these contacts may be placed elsewhere to prevent such closing action.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In an alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising inductive reactance means having windings respectively connected to the phase conductors of the system to provide a neutral point and a reactance device connected between said neutral point and ground and having a relatively high zero-sequence inductance compared to the zero-sequence inductance of said inductive reactance means, means for reducing the impedance of said inductive connection operative in dependence on the current flowing in the connection a predetermined time after the occurrence of a ground fault which is not suppressed by the lagging current flowing in the connection, means responsive to the increased flow of ground current in consequence of the reduction of the impedance of said inductive connection for effecting an interruption in the phase conductors of said system between the fault and the point of connection of said inductive reactance means to the system, means responsive in accordance with the heating of said inductive reactance means in consequence of the increased flow of ground current for restoring said inductive connection to its original inductive value within the current-time rating of said inductive reactance means whereby to prevent the destruction of the inductive reactance means in case of the failure of said increased ground current flow responsive means to function within said current-time rating, and means controlled by said heating responsive means for preventing a second reduction in the impedance of said inductive connection by said impedance reducing means when said increased ground current flow responsive means does not function.

2. In an alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising an inductive reactance means connected to the phase conductors of the system to provide a neutral and a reactance device connected between said neutral and ground and having a relatively high zero-sequence inductance compared to the zero-sequence inductance of said inductive reactance means, means for establishing a low impedance connection between said neutral and ground operative in dependence on the current flowing in said inductive connection a predetermined time after the occurrence of a ground fault which is not suppressed by the lagging current flowing in the inductive connection, means responsive to the increased flow of ground current in consequence of the establishment of said low impedance connection for effecting an interruption in the phase conductors of said system between the fault and the point of connection of said inductive reactance means to the system, and means responsive in accordance with the heating of said inductive reactance means in consequence of the increased flow of ground current for interrupting said low impedance connection within the current-time rating of said inductive reactance means whereby to prevent the destruction thereof in case of the failure of said increased ground current flow responsive means to function within said current-time rating.

3. In an alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising inductive reactance means connected to the phase conductors of the system to provide a neutral and a reactance device connected between said neutral and ground and having a relatively high zero-sequence inductance compared to the zero-sequence inductance of said inductive reactance, means for reducing the impedance of said inductive connection operative in dependence on the current flowing in the connection a predetermined time after the occurrence of a ground fault which is not suppressed by the lagging current flowing in the connection, means responsive to the increased flow of ground current in consequence of the reduction of the impedance of said inductive connection for effecting an interruption in the phase conductors of said system between the fault and the point of connection of said inductive reactance means to the system, means thermally responsive in accordance with the heating of said inductive reactance means in consequence of the increased flow of ground current therein for restoring said inductive connection to its original inductive value within the current-time rating of said inductive reactance means whereby to prevent the destruction thereof in case of the failure of said increased ground current flow responsive means to function within said current-time rating, and means controlled by said heating responsive means for preventing a reduction in the impedance of said inductive connection when the heating of said inductive reactance means exceeds a predetermined amount.

4. In an alternating current electric system of the type wherein a fault to ground on one phase conductor of the system substantially increases the capacitance current to ground of the ungrounded phase conductors of the system, a zero-sequence inductive connected to ground proportioned to provide on the occurrence of a ground on a phase conductor of the system a lagging current for effectively suppressing the capacitance current to ground at the grounded point and comprising inductive reactance means connected to the phase conductors of the system to provide a neutral and a reactance device connected between said neutral and ground and having a relatively high zero-sequence inductance compared to the zero-sequence inductance of said inductive reactance means, means for reducing the impedance of said inductive connection operative in dependence on the current flowing in the connection a predetermined time after the occurrence of a ground fault which is not suppressed by the lagging current flowing in the connection, means responsive to the increased flow of ground current in consequence of the reduction of the impedance of said inductive connection for effecting an interruption in the phase conductors of said system between the fault and the point of connection of said inductive reactance means to the system, means thermally responsive in accordance with the heating of said inductive reactance means in consequence of the increased flow of ground current therein for restoring said inductive connection to its original inductive value within the current-time rating of said inductive reactance means whereby to prevent the destruction thereof in case of the failure of said increased ground current flow responsive means to function within said current-time rating, and means controlled by said heating responsive means for preventing a reduction in the impedance of said inductive connection unless the heating of said inductive reactance means is below a predetermined amount.

5. In an alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising inductive reactance means connected to the phase conductors of the system to provide a neutral and a reactance device connected between said neutral and ground and having a relatively high zero-sequence inductance compared to the zero-sequence inductance of said inductive reactance means, means for reducing the impedance of said inductive connection operative in dependence on the current flowing in the connection a predetermined time after the occurrence of a ground fault which is not suppressed by the lagging current flowing in the connection, means responsive to the increased flow of ground current in consequence of the reduction of the impedance of said inductive connection for effecting an interruption in the phase conductors of said system between the fault and the point of connection of said inductive reactance means to the system, means thermally responsive in accordance with the heating of said inductive reactance means in consequence of the increased flow of ground current for restoring said inductive connection to its original inductive value within the current-time rating of said inductive reactance means whereby to prevent the destruction thereof in case of the failure of said increased ground current flow responsive means to function within said current-time rating, and means controlled by said heating responsive means for preventing a subsequent operation of said impedance reducing means.

6. In an alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising inductive reactance means connected to the phase conductors of the system to provide a neutral and an inductive reactance device connected between said neutral and ground and having a relatively high zero-sequence inductance compared to the zero-sequence inductance of said inductive reactance means, means for reducing the impedance of said inductive connection operative in dependence on the current flowing in the connection a predetermined time after the occurrence of a ground fault which is not suppressed by the lagging current flowing in the connection, means responsive to the increased flow of ground current in consequence of the reduction of the impedance of said inductive connection for effecting an interruption in the phase conductors of said system between the fault and the point of connection of said inductive reactance means to the system, and means thermally responsive in accordance with the heating of said inductive reactance means in consequence of the increased flow of ground current therein for restoring said inductive connection to its initial inductive value within the current-time rating of said inductive reactance means whereby to prevent the destruction thereof in case of the failure of said increased ground current flow responsive means to function within said current-time rating.

7. In an alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising inductive reactance means connected to the phase conductors of the system to provide a neutral and a reactance device connected between said neutral and ground and having a relatively high zero-sequence inductance compared to the zero-sequence inductance of said inductive reactance means, means for reducing the impedance of said inductive connection operative in dependence on the current flowing in the connection a predetermined time after the occurrence of a ground fault which is not suppressed by the lagging current flowing in the connection, and means thermally responsive in accordance with the heating of said inductive reactance means when the heating thereof exceeds a predetermined amount prior to the expiration of the predetermined time of operation of said impedance reducing means to prevent the operation thereof.

8. In a three-phase alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising a transformer having a set of delta-connected windings and a set of windings connected in Y to the phase conductors of the system and a reactance device connected between the neutral of said Y-connected windings and ground and having a relatively high zero-sequence inductance compared to the zero-sequence inductance of said transformer, means for connecting the neutral of said Y-connected windings substantially directly to ground comprising a switch and means operative in dependence on the current flowing in said inductive connection a predetermined time after the occurrence of a ground fault which is not suppressed by the lagging current flowing in the inductive connection for effecting the closing of said switch, means responsive to the increased flow of ground current in consequence of the closing of said switch for effecting an interruption of the phase conductors of the system between the fault and the point of connection of said Y-connected windings to the system, a thermal relay responsive in accordance with the heating of said transformer in consequence of the increased flow of ground current for effecting the opening of said switch within the current-time rating of the transformer whereby to prevent the destruction thereof in case of the failure of said increased ground current flow responsive means to function within said current-time rating, and a relay controlled by said thermal relay for preventing the reclosing of said switch when said increased ground fault flow responsive means fails to function.

9. In a three-phase alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising a transformer having a set of delta-connected windings and a set of windings connected in Y to the phase conductors of the system, and a reactance device connected between the neutral point of said Y-connected windings and ground and having a relatively high zero-sequence inductance compared to the zero-sequence inductance of said grounding transformer, means for connecting the neutral point of said Y-connected windings substantially directly to ground comprising a switch and means operative in dependence on the current flowing in said inductive connection a predetermined time after the occurrence of a ground fault which is not suppressed by the lagging current flowing in the inductive connection for effecting the closing of said switch, means responsive to the increased flow of ground current in consequence of the closing of said switch for effecting an interruption of the phase conductors of said system between the fault and the point of connection of said Y-connected windings to the system, a thermal relay responsive in accordance with the heating of said grounding transformer in consequence of the increased flow of ground current for effecting the opening of said switch within the current-time rating of the transformer whereby to prevent the destruction of the transformer in case of the failure of said increased ground current flow responsive means to function within said current-time rating, and means controlled by said thermal relay for preventing a second closing of said switch solely in dependence on the current flowing in said connection.

10. In a three-phase alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising a grounding transformer having a set of delta-connected windings and a set of windings connected in Y to the phase conductors of the system, and a reactance device connected between the neutral point of said Y-connected windings and ground and having a relatively high zero-sequence inductance compared to the zero-sequence inductance of said grounding transformer, means for connecting the neutral point of said Y-connected windings substantially directly to ground comprising a switch and means operative in dependence on the current flowing in said inductive connection a predetermined time after the occurrence of a ground fault which is not suppressed by the lagging current flowing in the inductive connection for effecting the closing of said switch, means responsive to the increased flow of ground current in consequence of the closing of said switch for effecting an interruption of the phase conductors of said system between the fault and the point of connection of said Y-connected windings to the system, and a thermal relay responsive to the heating of said grounding transformer in consequence of the increased flow of ground current for effecting the opening of said switch within the current-time rating of the transformer whereby to prevent the destruction of the transformer in case of the failure of said increased ground current flow responsive means to function within said current-time rating.

11. In a three-phase alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising a transformer having windings connected to the phase conductors of the system to provide a neutral, and a reactance device connected between said neutral and ground and having a relatively high zero-sequence inductance compared to the zero-sequence inductance of said transformer, means for connecting the neutral of said transformer substantially directly to ground comprising a switch, means operative in dependence on the current flowing in said inductive connection a predetermined time after the occurrence of a ground fault which is not suppressed by the lagging current flowing in the inductive connection for effecting the closing of said switch, means responsive to the increased flow of ground current in consequence of the closing of said switch for effecting an interruption of the phase conductors of the system between the fault and the point of connection of said transformer windings to the system, a thermal relay responsive in accordance with the heating of said transformer in consequence of the increased flow of ground current for effecting the opening of said switch within the current-time rating of the transformer whereby to prevent the destruction thereof in case of the failure of said increased ground current flow responsive means to function within said current-time rating.

12. In a three-phase alternating current electric system of the type wherein a fault to ground on one phase conductor of the system substantially increases the capacitance current to ground of the ungrounded phase conductors of the system, a zero-sequence inductive connection to ground proportioned to provide on the occurrence of a ground on a phase conductor of the system a lagging current for effectively suppressing the capacitance current to ground at the grounded point and comprising a transformer having windings connected to the phase conductors of the system to provide a neutral, and a reactance device connected between said neutral and ground and having a relatively high zero-sequence inductance compared to the zero-sequence inductance of said transformer, means for connecting the neutral of said transformer substantially directly to ground comprising a switch, and means operative in dependence on the current flowing in said inductive connection a predetermined time after the occurrence of a ground fault which is not suppressed by the lagging current flowing in the inductive connection for effecting the closing of said switch, means responsive to the increased flow of ground current in consequence of the closing of said switch for effecting an interruption of the phase conductors of the system between the fault and the point of connection of said transformer windings to the system, a thermal relay responsive in accordance with the heating of said transformer in consequence of the increased flow of ground current for effecting the opening of said switch within the current-time rating of the transformer whereby to prevent the destruction thereof in case of the failure of said increased ground current flow responsive means to function within said current-time rating, and a relay controlled by said thermal relay for preventing the reclosing of said switch when said increased ground fault flow responsive means fails to function.

PHILIP H. LIGHT.

CERTIFICATE OF CORRECTION.

Patent No. 2,326,149.  August 10, 1943.

PHILIP H. LIGHT.

It is hereby certified that error appears in the printed specification of the above numbered patent requiring correction as follows: Page 1, second column, line 51, for "espectially" read --especially--; Page 2, first column, line 64, for "and" read --any--; page 3, second column, line 20, strike out the period after "ways" and insert instead a comma; page 4, sec-second column, line 67, claim 4, for "connected" read --connection--; and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patents.